United States Patent
Zheng et al.

(10) Patent No.: US 9,498,775 B2
(45) Date of Patent: Nov. 22, 2016

(54) LEAN NOX TRAP DIESEL OXIDATION CATALYST WITH HYDROCARBON STORAGE FUNCTION

(75) Inventors: Xiaolai Zheng, Princeton Junction, NJ (US); Chung-Zong Wan, Somerset, NJ (US); Patrick Burk, Freehold, NJ (US)

(73) Assignee: BASF Corporation, Florham Park, NJ (US)

( * ) Notice: Subject to any disclaimer, the term of this patent is extended or adjusted under 35 U.S.C. 154(b) by 142 days.

(21) Appl. No.: 14/389,605

(22) PCT Filed: Apr. 6, 2012

(86) PCT No.: PCT/US2012/032486
§ 371 (c)(1),
(2), (4) Date: Jan. 20, 2015

(87) PCT Pub. No.: WO2013/151557
PCT Pub. Date: Oct. 10, 2013

(65) Prior Publication Data
US 2015/0139874 A1    May 21, 2015

(51) Int. Cl.
*B01J 23/02* (2006.01)
*B01J 23/40* (2006.01)
(Continued)

(52) U.S. Cl.
CPC .......... *B01J 37/0246* (2013.01); *B01D 53/944* (2013.01); *B01D 53/9481* (2013.01);
(Continued)

(58) Field of Classification Search
CPC ............ B01D 53/922; B01D 53/9445; B01D 53/9459; B01D 2255/102; B01D 2255/204; B01D 2255/206; B01D 2255/502; B01D 2255/9022; F01N 3/0814; F01N 3/101
See application file for complete search history.

(56) References Cited

U.S. PATENT DOCUMENTS

| | | |
|---|---|---|
| 4,335,023 A | 6/1982 | Dettling et al. |
| 5,958,826 A | 9/1999 | Kurokawa et al. |

(Continued)

FOREIGN PATENT DOCUMENTS

| | | | |
|---|---|---|---|
| DE | 102004012272 A1 * | 9/2004 | .............. B01J 23/58 |
| JP | 2007-330856 | 12/2007 | |
| WO | WO-2011/154913 | 12/2011 | |

OTHER PUBLICATIONS

PCT International Preliminary Report on Patentability in PCT/US2012/032486, dated Oct. 7, 2014, 11 pages.
(Continued)

*Primary Examiner* — Timothy Vanoy
(74) *Attorney, Agent, or Firm* — Womble Carlyle Sandridge & Rice, LLP

(57) ABSTRACT

The present invention is directed to a lean NOx trap diesel oxidation catalyst for the treatment of exhaust gas emissions, such as the oxidation of unburned hydrocarbons (HC), and carbon monoxide (CO) and the trapping and reduction of nitrogen oxides (NOx). Catalytic composites can comprise a catalytic material on a carrier, the catalytic material comprising a first NOx trap layer that comprises a NOx sorbent and one or more precious metal components located on the carrier and a second NOx trap layer containing hydrocarbon trapping functionality located over the first NOx trap layer that comprises a NOx sorbent, one or more precious metal components, and a zeolite, for example a beta zeolite, wherein the zeolite is substantially free of framework aluminum. Such zeolites are characterized by high crystallinity and/or by being substantially free of framework aluminum to minimize surface acidity.

15 Claims, 8 Drawing Sheets

(51) Int. Cl.

| | | |
|---|---|---|
| B01J 23/10 | (2006.01) | |
| B01J 29/00 | (2006.01) | |
| B01D 53/94 | (2006.01) | |
| F01N 3/24 | (2006.01) | |
| B01J 37/02 | (2006.01) | |
| B01J 29/035 | (2006.01) | |
| B01J 35/00 | (2006.01) | |
| F01N 3/08 | (2006.01) | |
| B01J 20/08 | (2006.01) | |
| B01J 20/18 | (2006.01) | |
| B01J 20/32 | (2006.01) | |
| B01J 23/46 | (2006.01) | |
| B01J 35/04 | (2006.01) | |

(52) U.S. Cl.
CPC ............... *B01J 20/08* (2013.01); *B01J 20/18* (2013.01); *B01J 20/3289* (2013.01); *B01J 23/464* (2013.01); *B01J 29/0354* (2013.01); *B01J 35/002* (2013.01); *B01J 37/0244* (2013.01); *F01N 3/0814* (2013.01); *F01N 3/0842* (2013.01); *B01D 53/9477* (2013.01); *B01D 2253/1085* (2013.01); *B01D 2253/1124* (2013.01); *B01D 2255/102* (2013.01); *B01D 2255/1025* (2013.01); *B01D 2255/204* (2013.01); *B01D 2255/2042* (2013.01); *B01D 2255/2045* (2013.01); *B01D 2255/502* (2013.01); *B01D 2255/9022* (2013.01); *B01D 2255/911* (2013.01); *B01D 2258/012* (2013.01); *B01J 35/04* (2013.01); *F01N 2510/063* (2013.01); *F01N 2510/0684* (2013.01); *Y02T 10/24* (2013.01)

(56) References Cited

U.S. PATENT DOCUMENTS

| | | |
|---|---|---|
| 6,191,061 B1 | 2/2001 | Takada et al. |
| 6,221,804 B1 | 4/2001 | Yamada et al. |
| 2002/0198098 A1 | 12/2002 | Yamamoto et al. |
| 2011/0061371 A1* | 3/2011 | Cavataio ................ F01N 3/035 60/286 |

OTHER PUBLICATIONS

PCT International Search Report and Written Opinion in PCT/US2012/032486, mailed Aug. 11, 2012, 14 pages.

* cited by examiner

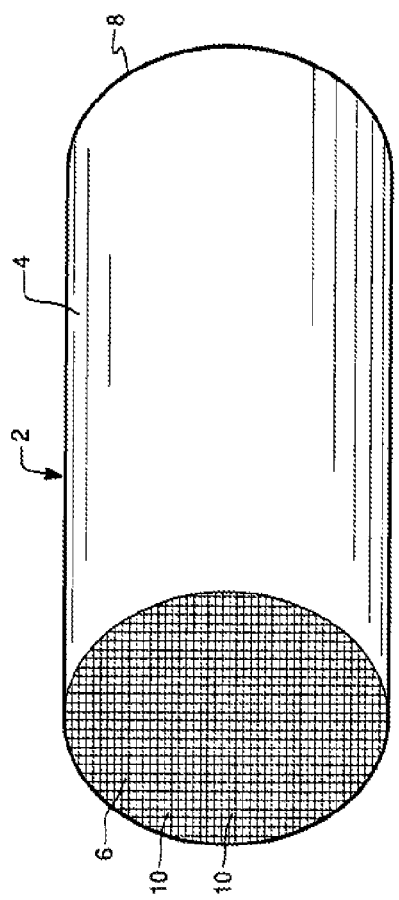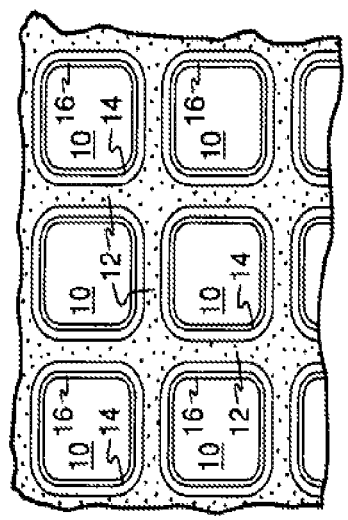

LEAN NOX TRAP DIESEL OXIDATION CATALYST WITH HYDROCARBON STORAGE FUNCTION

CROSS-REFERENCE TO RELATED APPLICATIONS

This application is the National Stage entry of PCT/US12/32486, filed on Apr. 6, 2012, which is incorporated herein by reference in its entirety.

FIELD

The present invention is directed to a lean NOx trap diesel oxidation catalyst (LNTDOC) that provides hydrocarbon (HC) storage function. More specifically, the present invention is directed to a catalytic composite whose catalytic material is effective to oxidize engine-out hydrocarbon (HC) and carbon monoxide (CO) emissions as well as handle HC slip during cold start while also being effective for NOx trapping and conversion.

BACKGROUND

Operation of lean burn engines, e.g., diesel engines and lean burn gasoline engines, provide the user with excellent fuel economy, and have very low emissions of gas phase hydrocarbons and carbon monoxide due to their operation at high air/fuel ratios under fuel lean conditions. Diesel engines, in particular, also offer significant advantages over gasoline engines in terms of their fuel economy, durability, and their ability to generate high torque at low speed.

From the standpoint of emissions, however, diesel engines present problems more severe than their spark-ignition counterparts. Emission problems relate to particulate matter (PM), nitrogen oxides (NOx), unburned hydrocarbons (HC) and carbon monoxide (CO). NOx is a term used to describe various chemical species of nitrogen oxides, including nitrogen monoxide (NO) and nitrogen dioxide ($NO_2$), among others.

Oxidation catalysts comprising a precious metal dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), or more simply catalytic converters, which are placed in the exhaust flow path from a Diesel-powered engine to treat the exhaust before it vents to the atmosphere. Typically, the diesel oxidation catalysts are formed on ceramic or metallic substrate carriers (such as the flow-through monolith carrier) upon which one or more catalyst coating compositions are deposited. In addition to the conversions of gaseous HC, CO and the SOF fraction of particulate matter, oxidation catalysts that contain platinum group metals (which are typically dispersed on a refractory oxide support) promote the oxidation of nitric oxide (NO) to $NO_2$.

Catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, an adsorbent material, which may be a zeolite, may be provided as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature.

One effective method to reduce NOx from the exhaust of lean-burn engines, such as gasoline direct injection and partial lean-burn engines, as well as from diesel engines, requires trapping and storing of NOx under lean burn engine operating conditions and reducing the trapped NOx under stoichiometric or rich engine operating conditions or lean engine operating with external fuel injected in the exhaust to induce rich conditions. The lean operating cycle is typically between 1 minute and 20 minutes and the rich operating cycle is typically short (1 to 10 seconds) to preserve as much fuel as possible. To enhance NOx conversion efficiency, the short and frequent regeneration is favored over long but less frequent regeneration. Thus, a lean NOx trap catalyst generally must provide a NOx trapping function and a three-way conversion function.

Some lean NOx trap (LNT) systems contain alkaline earth elements. For example, NOx sorbent components include alkaline earth metal oxides, such as oxides of Mg, Ca, Sr and Ba. Other lean LNT systems can contain rare earth metal oxides such as oxides of Ce, La, Pr and Nd. The NOx sorbents can be used in combination with precious metal catalysts such as platinum dispersed on an alumina support in the purification of exhaust gas from an internal combustion engine.

A conventional LNT typically contains basic sorbent components (e.g., $BaO/BaCO_3$ and/or $CeO_2$) for $NO_x$ storage and platinum group metals (PGM, i.e., Pt, Pd and Rh) for catalytic $NO_x$ oxidation and reduction. The LNT catalyst operates under cyclic lean (trapping mode) and rich (regeneration mode) exhaust conditions during which the engine out NO is converted to $N_2$ as shown in equations 1-6:

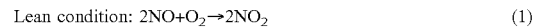

Lean condition: $2NO+O_2 \rightarrow 2NO_2$      (1)

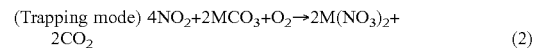

(Trapping mode) $4NO_2+2MCO_3+O_2 \rightarrow 2M(NO_3)_2+2CO_2$      (2)

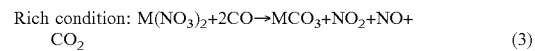

Rich condition: $M(NO_3)_2+2CO \rightarrow MCO_3+NO_2+NO+CO_2$      (3)

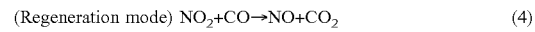

(Regeneration mode) $NO_2+CO \rightarrow NO+CO_2$      (4)

$2NO+2CO \rightarrow N_2+2CO_2$      (5)

$2NO+2H_2 \rightarrow N_2+2H_2O$      (6)

In preparation for the emerging Euro 6 automotive exhaust emission catalyst market to meet increasingly stringent NOx emissions, diesel oxidation catalysts (DOC) for diesel passenger cars may be replaced with a close-coupled lean NOx trap with diesel oxidation functionality (LNT-DOC) for engine displacements ranging from 1.2 to 2.5 L. In addition to managing NOx emissions from the vehicle, this change will require the LNTDOC to effectively oxidize engine-out hydrocarbon (HC) and carbon monoxide (CO) emissions. Specifically, this change requires that the LNT fulfill the de-$NO_x$ function of converting $NO_x$ to $N_2$ while also taking on the dual role of a DOC to oxidize engine-out hydrocarbons (HC) and carbon monoxide (CO) (Equations 7 and 8) and to generate an exotherm for the regeneration of a catalyzed soot filter (CSF).

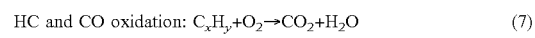

HC and CO oxidation: $C_xH_y+O_2 \rightarrow CO_2+H_2O$      (7)

$2CO+O_2 \rightarrow 2CO_2$      (8)

Current LNT technology is not efficient to handle the HC slip during vehicle cold start. The present invention provides an LNTDOC design in order to meet increasingly stringent emissions regulations.

SUMMARY

Embodiments of the present invention are directed to a lean NOx trap diesel oxidation catalyst (LNTDOC) for the treatment of exhaust gas emissions, such as the oxidation of unburned hydrocarbons (HC), and carbon monoxide (CO) and the reduction of nitrogen oxides (NOx). More particularly, the present invention is directed to catalytic composites having catalytic material formed from multi layers of washcoat where NOx trapping functionality may be provided in all layers and HC trapping functionality is provided in the outer layer. The HC trapping layer comprises a zeolite that minimizes the amount of framework aluminum. That is, the zeolite is substantially free of framework aluminum. In so doing, the deleterious interactions among non-silicate ($SiO_4$) framework and/or amorphous silica and the precious metals can be minimized. The catalytic material will be effective both to oxidize hydrocarbons and carbon monoxide and to trap and reduce NOx.

An aspect provides catalyst composites for abatement of exhaust gas emissions from an engine comprising: a catalytic material on a carrier, the catalytic material comprising a first NOx trap layer that comprises a first NOx sorbent and one or more precious metal components located on the carrier and a second NOx trap layer that comprises a second NOx sorbent, one or more precious metal components and a zeolite located, wherein the zeolite is substantially free of framework aluminum; wherein the catalytic material is effective to oxidize hydrocarbons and carbon monoxide and to trap and reduce NOx.

One detailed aspect provides catalyst composites for abatement of exhaust gas emissions from an engine comprising: a catalytic material on a carrier, the catalytic material comprising a first washcoat layer located on the carrier and a second washcoat layer located on the first washcoat layer. The first washcoat layer, which is the NOx trap layer, can comprise a first NOx sorbent component selected from alkaline earth elements; a precious metal component selected from platinum (Pt), palladium (Pd), or both and optionally rhodium (Rh); a first high surface area refractory metal oxide; and a rare earth oxide component. The second washcoat layer, which can be another NOx trap layer, which is optionally substantially free of alkaline earth elements, containing HC trapping functionality, can comprise a second NOx sorbent, at least one precious metal component selected from platinum (Pt), palladium (Pd) and rhodium; a second high surface area refractory metal oxide support; and a zeolite that is substantially free of framework aluminum.

In one aspect, diesel engine exhaust gas treatment systems comprise the catalyst composites provided herein upstream of a soot filter that is either catalyzed or uncatalyzed.

Another aspect is a method for treating a diesel exhaust gas stream that comprises contacting the exhaust gas stream with the catalyst composites provided herein that are effective to oxidize hydrocarbons and carbon monoxide and to trap and reduce NOx.

A further aspect is a method of making a catalyst composite that comprises forming a first NOx trap layer that comprises a first NOx sorbent and one or more precious metal components on a carrier; and forming another (second) NOx trap layer, which is optionally substantially free of alkaline earth elements, containing hydrocarbon trapping functionality, wherein the second NOx trap layer comprises a second NOx sorbent, one or more precious metal components and a zeolite that is substantially free of framework aluminum.

BRIEF DESCRIPTION OF THE DRAWINGS

FIG. 1 is a perspective view of a honeycomb-type refractory carrier member which may comprise a NOs trap diesel oxidation catalyst (LNTDOC) washcoat composition according to one embodiment;

FIG. 2 is a partial cross-sectional view enlarged relative to FIG. 1 and taken along a plane parallel to the end faces of the carrier of FIG. 1, which shows an enlarged view of one of the gas flow passages shown in FIG. 1;

DETAILED DESCRIPTION

Figure 3:
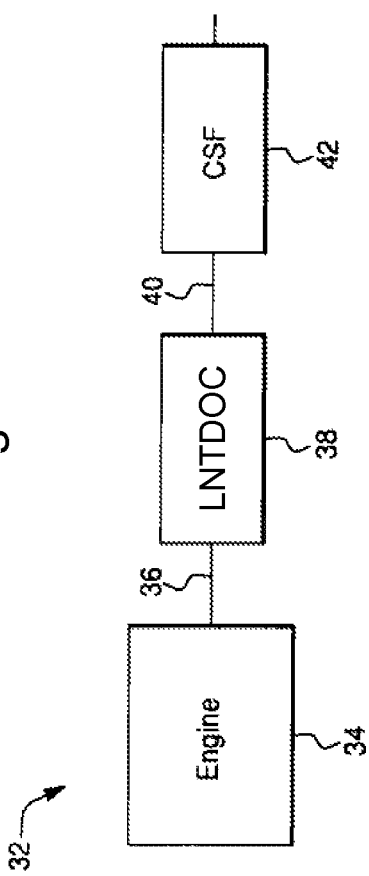
FIG. 3 is a schematic sketch of an engine emission treatment system, in accordance with one embodiment.

Before describing several exemplary embodiments of the invention, it is to be understood that the invention is not limited to the details of construction or process steps set forth in the following description. The invention is capable of other embodiments and of being practiced or being carried out in various ways.

In order to adapt current LNT technology to provide an LNTDOC that can handle HC slip during vehicle cold start, attempts to add zeolites to the outer layer of an LNT were made. It has been found that zeolites of certain properties damage NOx trapping capacity of the aged LNT catalyst and such catalysts provide lower NOx performance than LNT catalysts without such zeolites. Without intending to be bound by theory, it is thought that framework aluminum present in certain zeolites becomes reactive under high temperature aging conditions. The reactive structure of the zeolite induces deleterious interaction with the platinum group metals (PGMs). Zeolites used in the LNTDOC composites of the present invention minimize the formation of reactive structure which results in uncompromised NOx trapping capacity. Useful zeolites are those having large pore opening to allow HC molecules of diesel derived species to enter and be trapped. Good hydrothermal stability of the zeolites is also important since LNTDOC periodically will be exposed to high temperature operations. Beta zeolites are found rather useful in this application. Beta zeolites that comprise less than 2000 ppm aluminum concentration are particularly useful.

To minimize reactive structure present in the zeolites, it is beneficial to have essentially all the silicon atoms bound in the zeolite framework so that high crystallinity can be obtained. High crystallinity can be characterized by the sharpness and intensity of X-ray Diffraction (XRD) measurements. Peaks in addition to the tetrahedron $\underline{Si}(OSi)_4$ region in the solid state $^{29}Si$ NMR spectrum can be indicators that reactive structures are present. In one or more embodiments, the Si peaks in a solid state $^{29}$Si NMR spectrum of the zeolite are essentially for tetrahedron Si(OSi)$_4$ centers, which means that there are minimal (due to trace impurities) to no other peaks in the spectrum. Reducing the amount of aluminum atoms in the zeolitic framework structure provides zeolites of low acidity meaning that deactivation of the HC trapping function via coking is minimized or even eliminated. Solid state $^{27}$Al NMR spectra can be indicative of zeolites that are essentially free of framework aluminum by the absence of peaks assignable to coordinated Al centers. In one or more embodiments, the zeolite is essentially free of framework aluminum, which means that there are minimal to no peaks of tetra- and hexa-coordinated Al centers in the solid state $^{27}$Al NMR spectrum. Diffuse Reflectance Infrared Fourier Transform (DRIFTS) spectroscopy using pyridine as a probe molecule is useful to determine the acidity of the zeolites. In one or more embodiments, the zeolite comprises essentially no acid sites as measured by pyridine-adsorption diffuse reflectance infrared Fourier transform (DRIFT) spectroscopy. "Essentially no acid sites" means that there are minimal (due to trace impurities) to no peaks assignable to the acidic sites in the measurement.

Typically, the lean NOx trap diesel oxidation catalyst washcoat composition of the present invention is disposed on a substrate. The substrate may be any of those materials typically used for preparing catalysts, and will typically comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to herein as flow-through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc.

Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. The ceramic substrate may be made of any suitable refractory material, e.g., cordierite, cordierite-alumina, silicon nitride, or silicon carbide, or the substrates may be composed of one or more metals or metal alloys.

The lean NOx trap diesel oxidation catalyst washcoat compositions according to embodiments of the present invention can be applied to the substrate surfaces by any known means in the art. For example, the catalyst washcoat can be applied by spray coating, powder coating, or brushing or dipping a surface into the catalyst composition.

Reference to a "support" in a catalyst washcoat layer refers to a material that receives precious metals, stabilizers, promoters, binders, and the like through association, dispersion, impregnation, or other suitable methods. Useful high-surface area supports include one or more refractory oxides. These oxides include, for example, silica and alumina, titania and zirconia include mixed oxide forms such as silica-alumina, aluminosilicates which may be amorphous or crystalline, alumina-zirconia, alumina-ceria and the like and titanium-alumina and zirconium-silicate. In one embodiment, the support is comprised of alumina which includes the members of the gamma, delta, theta or transitional aluminas, such as gamma and eta aluminas, and, if present, a minor amount of other refractory oxide, e.g., about up to 20 weight percent. High surface refractory metal oxide supports refer to support particles having pores larger than 20 Å and a wide pore distribution. High surface area refractory metal oxide supports, e.g., alumina support materials, also referred to as "gamma alumina" or "activated alumina," typically exhibit a BET surface area in excess of 60 square meters per gram ("m$^2$/g"), often up to about 200 m$^2$/g or higher. "BET surface area" refers to the Brunauer, Emmett, Teller method for determining surface area by N$_2$ adsorption. Desirably, the active alumina has a specific surface area of 60 to 350 m$^2$/g, and typically 90 to 250 m$^2$/g. In specific embodiments, the loading on the refractory oxide support is from about 0.5 to about 6 g/in$^3$, more specifically from about 2 to about 5 g/in$^3$ and most specifically from about 3 to about 4 g/in$^3$.

The second NOx trap layer comprises hydrocarbon trapping functionality. Hydrocarbon trapping may be provided by one or more hydrocarbon (HC) storage components for the adsorption of various hydrocarbons (HC). Typically, hydrocarbon storage material having minimum interactions of precious metals and the material can be used, e.g., a micro-porous material such as a zeolite or zeolite-like material. Preferably, the hydrocarbon storage material is a zeolite. Beta zeolite is particularly preferable since large pore opening of beta zeolite allows hydrocarbon molecules of diesel derived species to be trapped effectively. Other zeolites such as faujasite, chabazite, clinoptilolite, mordenite, silicalite, zeolite X, zeolite Y, ultrastable zeolite Y, ZSM-5 zeolite, offretite, can be used in addition to the beta zeolite to enhance HC storage in the cold start operation. Specific zeolite adsorbent materials may have a high silica-to-alumina ratio. The zeolites may have a silica/alumina molar ratio of at least about 100/1. A particularly specific zeolite may comprise a beta zeolite of a silica/alumina molar ratio of at least 500/1. The zeolite loading should not be smaller than 0.1 g/in$^3$ in order to guarantee sufficient HC storage capacity. In specific embodiments the zeolite content is in the range of 0.1-1.0 g/in$^3$. Higher zeolite loadings than 1.0 g/in$^3$ may adversely affect the CO and HC light-off performance.

In one embodiment, the washcoat composition of the present invention comprises two distinct washcoat layers coated on a single substrate or carrier member, one layer (e.g., the second or top washcoat layer) over top of the other (e.g., the first or bottom washcoat layer). In this embodiment, the first or bottom washcoat layer is coated over the entire axial length of a substrate (e.g., a flow-through monolith) and the second or top washcoat layer is coated over the entire axial length of the first or bottom washcoat layer.

The washcoat composition of this embodiment may be more readily appreciated by reference to FIGS. 1 and 2. FIGS. 1 and 2 show a refractory carrier member 2, in accordance with one embodiment of present invention. Referring to FIG. 1, the refractory carrier member 2 is a cylindrical shape having a cylindrical outer surface 4, an upstream end face 6 and a downstream end face 8, which is identical to end face 6. Carrier member 2 has a plurality of fine, parallel gas flow passages 10 formed therein. As seen in FIG. 2 flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2 walls 12 are so dimensioned and configured that gas flow passages 10 have a substantially regular polygonal shape, substantially square in the illustrated embodiment, but with rounded corners in accordance with U.S. Pat. No. 4,335,023, issued Jun. 15, 1982 to J. C. Dettling et al. A discrete bottom layer 14, which in the art and sometimes below is referred to as a "washcoat", is adhered or coated onto the walls 12 of the carrier member. As shown in FIG. 2, a second discrete top washcoat layer 16 is coated over the bottom washcoat layer 14.

As shown in FIG. 2, the carrier member include void spaces provided by the gas-flow passages 10, and the cross-sectional area of these passages 10 and the thickness of the walls 12 defining the passages will vary from one type of carrier member to another. Similarly, the weight of washcoat applied to such carriers will vary from case to case. Consequently, in describing the quantity of washcoat or catalytic metal component or other component of the composition, it is convenient to use units of weight of component per unit volume of catalyst carrier. Therefore, the units of grams per cubic inch ("g/in$^3$") and grams per cubic foot ("g/ft$^3$") are used herein to mean the weight of a component per volume of the carrier member, including the volume of void spaces of the carrier member.

During operation, exhaust gaseous emissions from a lean burn engine comprising hydrocarbons, carbon monoxide, nitrogen oxides, and sulfur oxides initially encounter the top washcoat layer 16, and thereafter encounter the bottom washcoat layer 14.

In another embodiment, the distinct washcoat layers of the present invention may be zone coated such that the washcoat layer containing the HC trap component is on the upstream end of the carrier substrate. For example, an upstream washcoat layer can be coated over a portion of the upstream region of the substrate and a downstream washcoat layer can be coated over a portion of the downstream end of the carrier substrate. In this embodiment, the top washcoat layer of the present invention can be also coated in the upstream portion over a bottom washcoat layer on the carrier substrate.

The lean NOx trap diesel oxidation catalyst (LNTDOC) of the present invention can be used in an integrated emission treatment system comprising one or more additional components for the treatment of diesel exhaust gas emissions. For example, the emission treatment system may further comprise a soot filter component. The soot filter may be catalyzed for specific functions. The LNTDOC can be located upstream of the soot filter.

In a specific embodiment, the soot filter is a catalyzed soot filter (CSF). The CSF can comprise a substrate coated with a washcoat layer containing one or more catalysts for burning off trapped soot and or oxidizing exhaust gas stream emissions. In general, the soot burning catalyst can be any known catalyst for combustion of soot. For example, the CSF can be coated with a one or more high surface area refractory oxides (e.g., alumina, silica, silica alumina, zirconia, and zirconia alumina) and/or an oxidation catalyst (e.g., a ceria-zirconia) for the combustion of unburned hydrocarbons and to some degree particulate matter. However, preferably the soot burning catalyst is an oxidation catalyst comprising one or more precious metal (PM) catalysts (platinum, palladium, and/or rhodium).

In general, any known filter substrate in the art can be used, including, e.g., a honeycomb wall flow filter, wound or packed fiber filter, open-cell foam, sintered metal filter, etc., with wall flow filters being specifically exemplified. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Specific wall flow substrates have a wall thickness of between 0.002 and 0.015 inches.

The porous wall flow filter used in embodiments of the invention is optionally catalyzed in that the wall of said element has thereon or contained therein one or more catalytic materials, such CSF catalyst compositions are described hereinabove. Catalytic materials may be present on the inlet side of the element wall alone, the outlet side alone, both the inlet and outlet sides, or the wall itself may consist all, or in part, of the catalytic material. In another embodiment, this invention may include the use of one or more washcoat layers of catalytic materials and combinations of one or more washcoat layers of catalytic materials on the inlet and/or outlet walls of the element.

In one embodiment, the present invention is directed to an emission treatment system comprising one or more additional components for the treatment of diesel exhaust gas emissions. An exemplified emission treatment system may be more readily appreciated by reference to FIG. 3, which depicts a schematic representation of an emission treatment system 32, in accordance with this embodiment of the present invention. Referring to FIG. 3, an exhaust gas stream containing gaseous pollutants (e.g., unburned hydrocarbons, carbon monoxide and NOx) and particulate matter is conveyed via line 36 from an engine 34 to a NOx trap diesel oxidation catalyst (LNTDOC) 38, which is coated with the novel washcoat composition of the present invention. In the LNTDOC 38, unburned gaseous and non-volatile hydrocarbons (i.e., the VOF) and carbon monoxide are largely combusted to form carbon dioxide and water. In addition, the NOx is trapped and reduced in the LNTDOC. The exhaust stream is next conveyed via line 40 to a catalyzed soot filter (CSF) 42, which traps particulate matter present within the exhaust gas stream. The CSF 42 is optionally catalyzed for passive regeneration. After removal of particulate matter, via CSF 42, the exhaust gas stream is conveyed further down and out of the exhaust line.

EXAMPLES

Example 1

Example 1A represents a beta zeolite powder sample that is substantially free of framework aluminum. The aluminum content of Example 1A is about 1370 ppm determined by Inductively Coupled Plasma (ICP) method, corresponding to a silica-to-alumina ratio (SAR) of about 650. Example 1B is a comparative beta zeolite powder sample that contains framework aluminum. The aluminum content of Example 1B is about 7380 ppm measured by the ICP method, corresponding to a SAR of about 120 (Table 1).

TABLE 1

| Example | zeolite structure | Source | Silica-to-alumina ratio (SAR) |
|---|---|---|---|
| 1A | Beta | BASF | 650 |
| 1B (COMPARATIVE) | H-Beta | BASF | 120 |

Example 2

Testing

Powder samples from Examples 1A and 1B were hydrothermally aged in a reactor at 800° C. for 5 hours in air containing 10% water. The aged powder samples from Example 1A and 1B then were individually characterized by XRD, solid state NMR and DRIFT techniques.

X-Ray diffraction (XRD) data of the aged samples were collected on a PANalytical MPD X'Pert Pro Diffractometer using Cu—$K_\alpha$ radiation with generator settings of 45 kV and 40 mA. The samples, after being ground in a mortar, were passed onto a low background single crystal Si mount. The data collection from the round mount covered a 2θ range from 3° to 70° using a step scan with a 2θ step size of 0.016° and a count time of 60 seconds per step.

Figure 4:
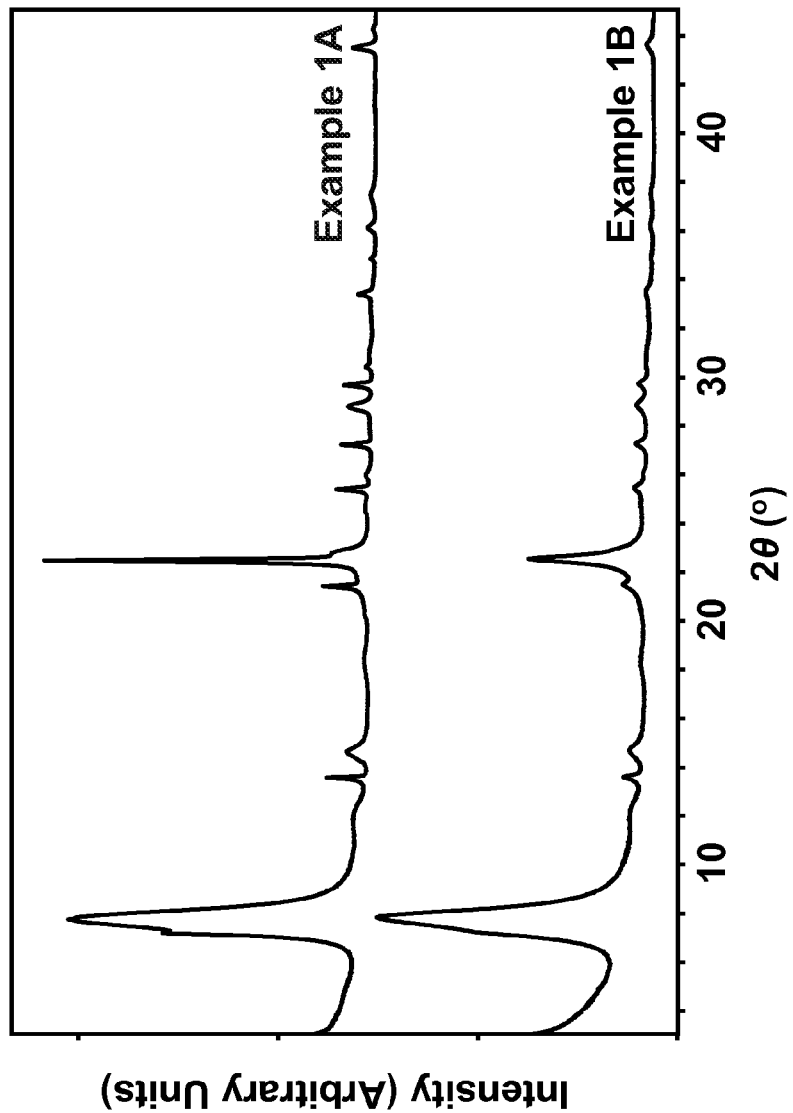
FIG. 4 is a graph of XRD patterns of beta zeolites after hydrothermal aging.

As shown in FIG. 4, both samples display a characteristic diffraction pattern consistent with a beta zeolite structure. The diffraction peaks of aged Example 1A are significantly sharper and more intense than those of Example 1B comprising a conventional H-Beta. This indicates that beta zeolite of Example 1A exhibits a higher crystallinity. The diffraction patterns of the corresponding fresh samples (not shown) and aged samples were essentially the same, indicative of both beta zeolite samples 1A and 1B possess very good hydrothermal stability.

Solid state NMR spectra of the aged beta zeolites were acquired on a Varian Unity Inova 400 MHz spectrometer. $^{27}Al$ NMR spectra were measured using π/12 pulses and a relaxation delay of 1 second at a spinning rate of 10 k Hz. $^{29}Si$ NMR spectra were measured using a π/4 pulses and a relaxation delay of 60 seconds at a spinning rate of 3.5 kHz. Aluminum nitrate solution and TMS were used as primary references for $^{27}Al$ and $^{29}Si$, respectively.

Figure 5A:
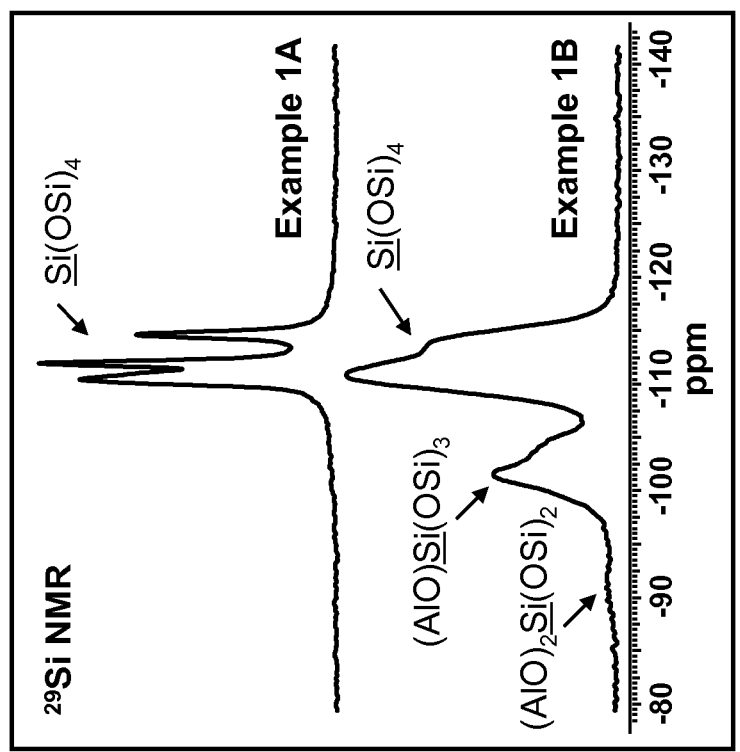
FIG. 5A is a graph of solid state $^{29}Si$ NMR spectra of beta zeolites.

As shown in FIG. 5A, the $^{29}Si$ NMR spectrum of aged Example 1A exhibits three well resolved peaks located from −108 to −115 ppm. These peaks are the typical signals derived from the tetrahedron $\underline{Si}(OSi)_4$ centers in different chemical environments. There are no other signals outside the defined tetrahedron $\underline{Si}(OSi)_4$ center, that indicates that almost all the silicon atoms are associated with siliceous zeolitic framework. In contrast, aged Example 1B displays three broad $^{29}Si$ peaks. The center of each peak locates approximately at −111, −101, and −92 ppm that are assignable to silicon atom in $\underline{Si}(OSi)_4$, $(AlO)\underline{Si}(OSi)_3$, and $(AlO)_2\underline{Si}(OSi)_2$ structures respectively. The signals of $(AlO)\underline{Si}(OSi)_3$ and $(AlO)_2\underline{Si}(OSi)_2$ are indicators of the existence of aluminum in the zeolitic framework.

Figure 5B:
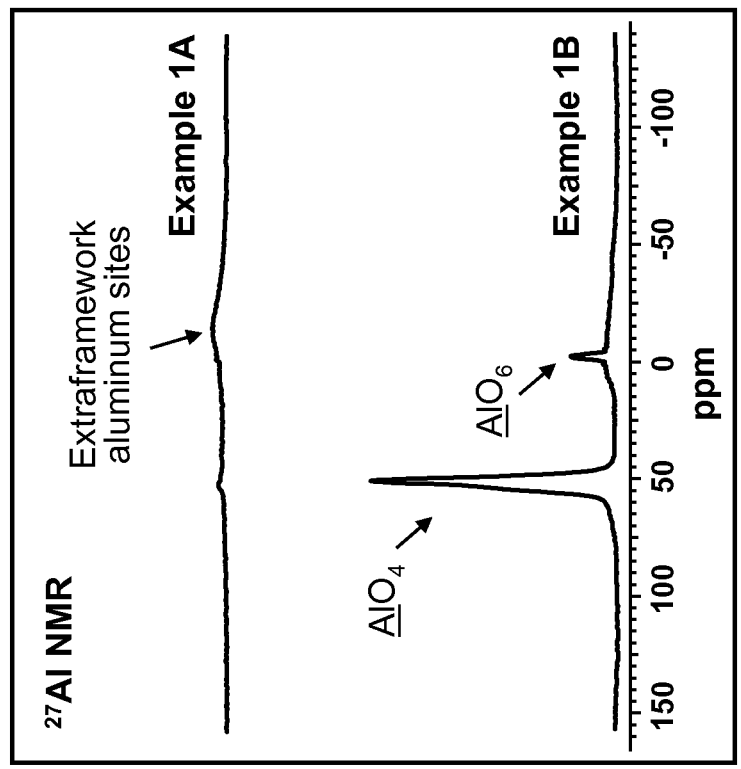
FIG. 5B is a graph of solid state $^{27}Al$ NMR spectra of beta zeolites.

In the $^{27}Al$ NMR spectra (FIG. 5B), aged Example 1A shows a broad and very weak peak around −15 ppm that may be attributed to the residual extra-framework aluminum species. Aged Example 1B displays two intense peaks at 50 and −3 ppm. They correspond to the aluminum in tetra- and hexa-coordinated framework sites, respectively.

Diffuse Reflectance Infrared Fourier Transform (DRIFTS) spectroscopy is useful to determine the acidity of the beta zeolites using a basic species, pyridine as a probe molecule. The DRIFT spectra were collected on a Perkin-Elmer Paragon 1000PC spectrometer equipped with a MCT detector and a Spectra-Tech diffuse reflectance high temperature chamber with KBr windows allowing $N_2$ to flow through. Approximately 40 mg of sample was ground into a fine powder with an agate mortar and transferred into an aluminum sample cup. After dehydration at 450° C. for one hour, a pyridine vapor of a partial pressure of 18 mmHg in $N_2$ was introduced for one minute during which the samples were exposed to approximately $4\times10^{-5}$ moles of pyridine. The samples were heated at 180° C. under flowing $N_2$ for 1 hour to remove physisorbed pyridine. Single beam spectra, collected at ambient temperature, were converted to Kubelka-Munk spectra after baseline and offset corrections. Bands at 1542 and 1458 $cm^{-1}$ were chosen to quantify the number of Brønsted and Lewis acid sites, respectively.

Figure 6:
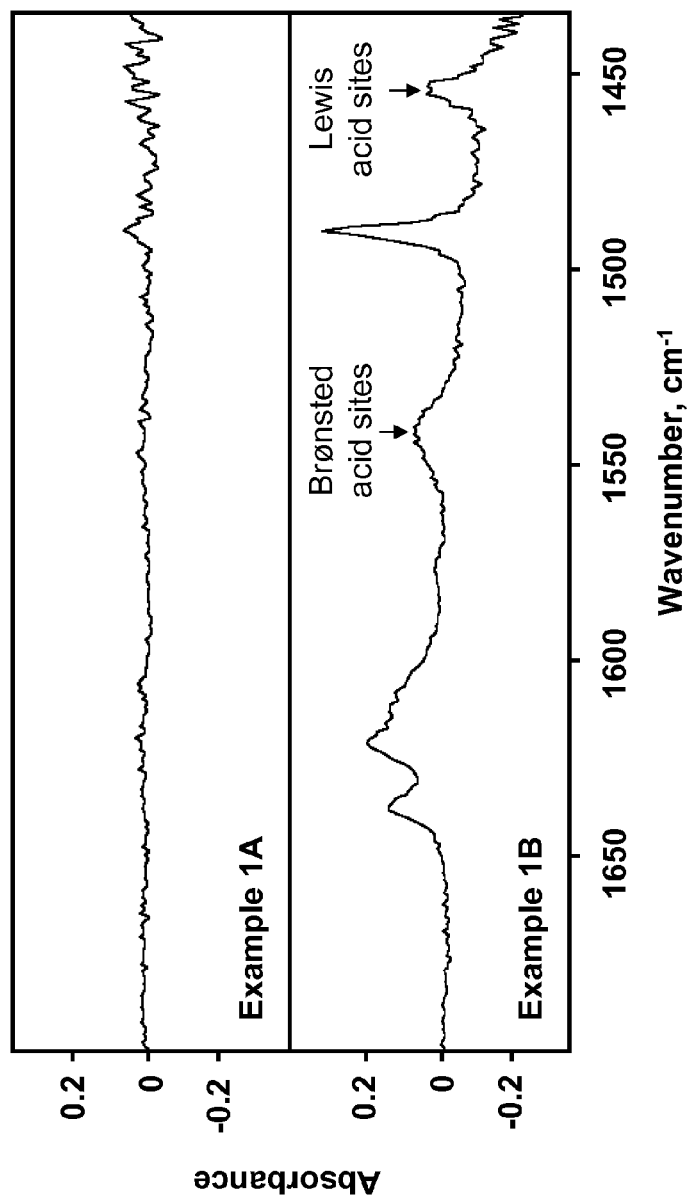
FIG. 6 is a graph of pyridine-absorption DRIFT spectra of beta zeolites after desorption at 180° C.

As shown in FIG. 6, the pyridine absorbance of aged Example 1A is insignificant, which is indicative of essentially no pyridine molecules being adsorbed. The absence of detectable acid sites is consistent with the high SAR (650) and the substantially free of framework aluminum nature of Example 1A. In contrast, aged Example 1B of a conventional H-beta shows an absorption band and exhibits about 184 μmol/g Brønsted acid sites and 230 μmol/g Lewis acid sites.

Example 3

To demonstrate the advantage of this invention, an example of the preparation of LNTDOC catalyst comprising a beta zeolite substantially free of framework aluminum was prepared. The catalyst has catalytic materials in two layers: a first NOx trap layer and a second NOx trap layer. The catalyst layers are disposed on a flow-through monolith substrate having a cell density of 400 cells per square inch (cpsi) and a 4 mil wall thickness. The catalyst has a total 120 g/ft³ PGM nominal loading with a Pt/Pd/Rh ratio of 103:10.5:6.5.

The first NOx trap layer contains an activated γ-alumina containing 10% ceria and 18% baria ($BaO/CeO_2/\gamma-Al_2O_3$), ceria oxide (87% of the ceria being in particulate form), magnesia, zirconia, platinum, and palladium at concentrations of approximately 72.2%, 20.7%, 4.5%, 1.8%, 0.7%, and 0.1%, respectively, based on the calcined weight of the catalyst. Pd in the form of palladium nitrate and Pt in the form of platinum amine solution were introduced onto the $BaO/CeO_2/\gamma-Al_2O_3$ mixed oxides by conventional incipient wetness technique. The total washcoat loading of the first layer after 550° C. calcination for one hour in air was about 5.12 g/in³.

The second NOx trap layer contains an activated γ-alumina, ceria in particulate form, beta zeolite, platinum, palladium, and rhodium at concentrations of approximately 42.0%, 35.0%, 21.0%, 1.6%, 0.1%, and 0.3%, respectively, based on the calcined weight of the catalyst. The beta zeolite of Example 1A that was substantially free of framework aluminum is utilized. Pd in the form of palladium nitrate and Pt in the form of platinum amine solution and Rh in the form of rhodium nitrate were introduced onto γ-alumina and ceria by conventional incipient wetness technique. The second NOx trap layer was coated over the entire first NOx trap layer. The total washcoat of the second layer after 500° C. calcination was about 1.43 g/in³.

Example 4

Comparative

A LNTDOC catalyst comprising a conventional H-beta zeolite that contains framework aluminum was made for comparison. The catalyst was prepared following the same procedures described in the Example 3 except the beta zeolite was replaced with the H-beta of Example 1B in the second NOx trap layer. The total washcoat of the first NOx trap layer was about 5.15 g/in$^3$ and the second NOx trap layer was about 1.45 g/in$^3$.

Example 5

Comparative

A LNT catalyst without any zeolite was made for comparison. The catalyst was prepared following the same procedures described in the Example 3 except no zeolite was used in the second NOx trap layer. The final washcoat loading of the first layer was about 5.32 g/in$^3$. The second NOx trap layer contained an activated γ-alumina, ceria, platinum, palladium, and rhodium at concentrations of approximately 56.9%, 40.7%, 1.9%, 0.2%, and 0.3%, respectively, based on the calcined weight of the catalyst. The total washcoat loading of the second layer was about 1.23 g/in$^3$.

Example 6

Testing

Core samples of 1.0 inch in diameter and 1.5 inches in length were removed from the finished catalysts of Examples 3, 4, and 5. To simulate the deactivation in real word application, catalyst samples were subjected to hydrothermal aging first and then to multiple cycles of sulfation/desulfation ($SO_x$/de-$SO_x$) aging. The hydrothermal aging was performed at 800° C. in flowing air at 15,000 per hour space velocity in the presence of 10% water for five hours. The $SO_x$/de-$SO_x$ aging was accomplished with ten $SO_x$/de-$SO_x$ cycles. Each cycle contained a sulfation step and a desulfation step. The sulfation step loaded 1.4 g of sulfur per liter of the catalyst at 300° C. in 45 minutes at a space velocity of 45 k per hour. The desulfation step contained lean-rich cycling operation. The lean (10 seconds, lambda=1.08) and rich (10 seconds, lambda=0.97) exposure resulted in a catalyst mid-bed temperature of about 800° C. The desulfation step lasted for 20 minutes. Gas compositions of the sulfation step were 28.6 ppm $SO_2$, 50 ppm NO, 10% $O_2$, 5% $CO_2$, 10% $H_2O$, and balance $N_2$. The desulfation step operates at a space velocity of 67 k per hour. Gas compositions of the lean cycle in the desulfation were 34 ppm NO, 1.8% $O_2$, 3.4% $CO_2$, 6.7% $H_2O$, and balance $N_2$. Gas composition of the rich cycle in the desulfation was 34 ppm NO, 0.94% $H_2$, 2.8% CO, 1% $O_2$, 3.4% $CO_2$, 6.7% $H_2O$, and balance $N_2$.

The DOC performances, primarily the HC and CO, of the LNTDOC catalysts were evaluated on a Diesel Vehicle Simulator (DVS). The gas composition, gas temperature and gas flow of catalyst inlet in DVS evaluations mimic the New European Drive Cycle (NEDC) engine exhaust trace from a EU5 calibrated Renault engine. Two NEDC cycles were performed and the data from the second run are summarized in FIG. 7.

Figure 8:
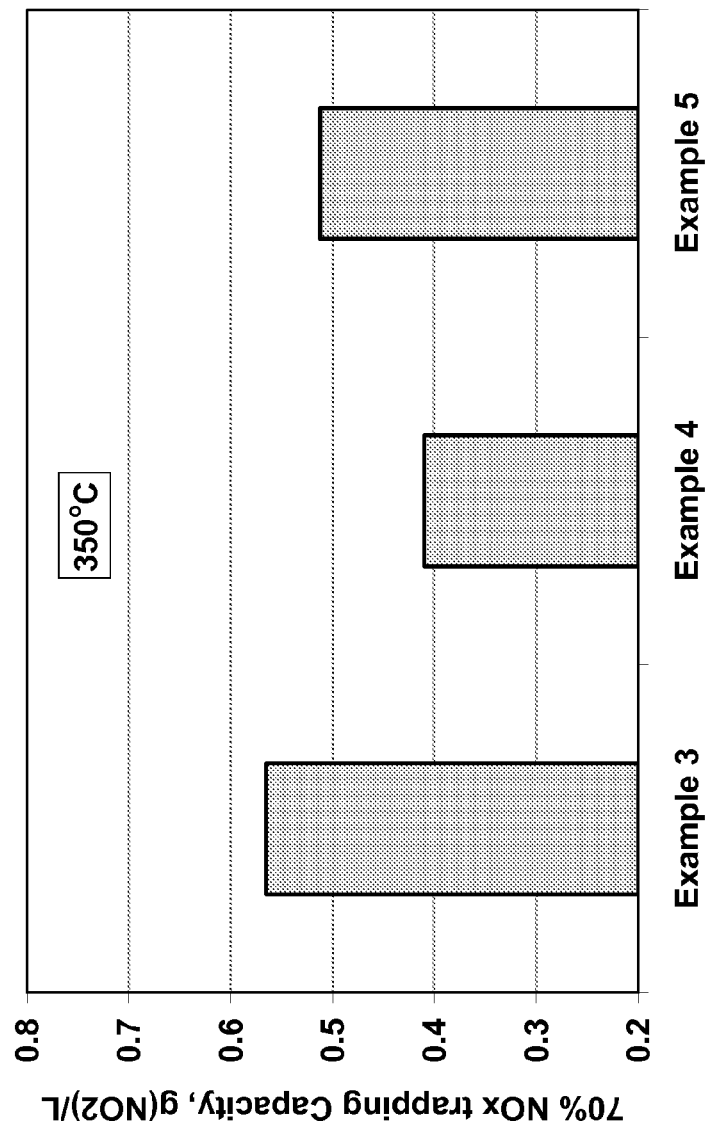
FIG. 8 provides a graph of NOx trapping performance data at 350° C.

The NOx performances of the LNTDOC catalysts were evaluated on a laboratory reactor. NOx trapping capacity, typically at 70% trapping efficiency was measured after the catalyst was exposed to a lean exhaust composition. The aged catalyst underwent a lean/rich cyclic conditioning at the test temperature before the capacity measurement. The lean/rich cyclic conditioning was 120 seconds lean exhaust exposure and a rich 10 seconds regeneration at λ=0.97. The total $NO_x$ flux per lean/rich cycle was about 0.64 g $NO_2$ per liter of catalyst at a space velocity of 68,000 per hour. Gas compositions of the lean exhaust was 150 ppm NO, 14% $O_2$, 5% $CO_2$, 4% $H_2O$, and balance $N_2$ and the rich regeneration was 1.93% CO/$H_2$ (3:1), 900 ppm $C_3H_6$, 1% $O_2$, 5% $CO_2$, 4% $H_2O$, and balance $N_2$. A minimum of six lean/rich cycles was employed. FIG. 8 presents the trapping capacity test results at 350° C.

Figure 7:
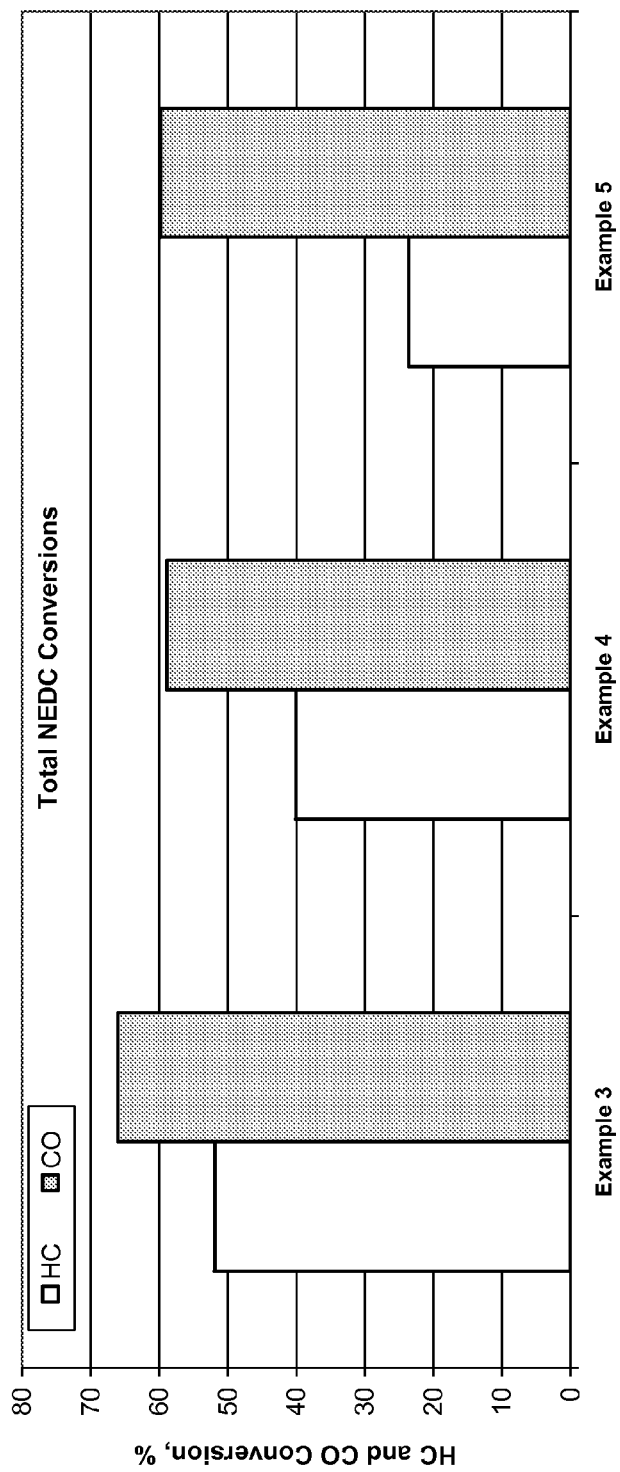
FIG. 7 provides a graph of HC and CO performance data in the NEDC test.

As shown in FIG. 7, the HC conversion of catalyst from Example 3 of the present invention outperforms both the catalyst from Example 4 having a conventional H-beta HC trapping component and the catalyst from Example 5 without a HC trapping component. In addition, catalyst from Example 3 of the present invention shows an improvement of 6-7% CO oxidation activity over the samples of Examples 4 and 5.

In FIG. 8, the catalyst of Example 4 containing a conventional H-beta HC trapping component shows a noticeable loss of the NOx trapping capacity when compared to the catalyst of Example 5 without employing a HC trapping component, which suggests that undesirable interactions among the PGM and the beta zeolite having framework aluminum cause the performance loss. Without intended to be bound by theory, Example 3 of the present invention, employing the beta zeolite of substantially free of framework aluminum, apparently eliminates the deleterious interactions and preserves the $NO_x$ performance of the PGM.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The order of description of the above method should not be considered limiting, and methods may use the described operations out of order or with omissions or additions.

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

What is claimed is:

1. A catalyst composite for abatement of exhaust gas emissions from an engine comprising: a catalytic material on a carrier, the catalytic material comprising a first NOx trap layer that comprises a first NOx sorbent and one or more precious metal components located on the carrier and a second NOx trap layer that comprises a second NOx sorbent, one or more precious metal components, and a zeolite, wherein the zeolite is substantially free of framework aluminum; wherein the catalytic material is effective to oxidize hydrocarbons and carbon monoxide and to trap and reduce NOx.

2. The catalyst composite of claim 1, wherein the zeolite comprises a beta zeolite.

3. The catalyst composite of claim 1, wherein the Si structure in a solid state $^{29}$Si NMR spectrum of the zeolite is essentially for tetrahedron $\underline{Si}(OSi)_4$ centers.

4. The catalyst composite of claim 1, wherein the zeolite comprises essentially no acid sites as measured by pyridine-adsorption diffuse reflectance infrared Fourier transform (DRIFT) spectroscopy.

5. The catalyst composite of claim 1, wherein the Al structure in a solid state $^{27}$Al NMR spectrum of the zeolite is essentially free of signals of tetra- and hexa-coordinated aluminum centers.

6. A catalyst composite for abatement of exhaust gas emissions from an engine comprising: a catalytic material on a carrier, the catalytic material comprising a first NOx trap layer located on the carrier and a second NOx trap layer located on the first NOx trap layer, wherein:
    the first NOx trap layer comprises an alkaline earth component; a rare earth oxide component; a precious metal component; a first high surface area refractory metal oxide support;
    the second NOx trap layer comprises a precious metal component; a second high surface area refractory metal oxide support; a rare earth oxide component, and a zeolite that is substantially free of framework aluminum; and
    wherein the catalytic material is effective to oxidize hydrocarbons and carbon monoxide and to trap and reduce NOx.

7. The catalyst composite of claim 6, wherein the alkaline earth component of the first NOx trap layer is selected from the group consisting of oxides of Mg, Ca, Sr, Ba, and combinations thereof.

8. The catalyst composite of claim 6, wherein the zeolite comprises a beta zeolite.

9. The catalyst composite of claim 8, wherein the zeolite comprises a beta zeolite that comprises less than 2000 ppm aluminum concentration.

10. A method for treating a diesel exhaust gas stream comprising contacting the exhaust gas stream with the catalyst composite of claim 1 that is effective to oxidize hydrocarbons and carbon monoxide and to trap and reduce NOx.

11. The method of claim 10, further comprising directing the diesel exhaust gas stream to a soot filter downstream of the catalyst composite.

12. A method of making a catalyst composite, the method comprising:
    forming a first NOx trap layer that comprises a first NOx sorbent and one or more precious metal components on a carrier; and
    forming a second NOx trap layer on the first NOx trap layer, wherein the second NOx trap layer comprises a second NOx sorbent, one or more precious metal components, and a zeolite that is substantially free of framework aluminum.

13. The method of claim 12, wherein the zeolite comprises a beta zeolite.

14. The catalyst composite of claim 12, wherein the Si structure in a solid state $^{29}$Si NMR spectra of the zeolite is essentially for tetrahedron $\underline{Si}(OSi)_4$ center.

15. The method of claim 12, wherein the zeolite exhibits essentially no acid sites as measured by pyridine-adsorption diffuse reflectance infrared Fourier transform (DRIFT) spectroscopy.

\* \* \* \* \*